H. A. ALDEN.
Car Spring.
No. 44,925.  Patented Nov. 8, 1864.
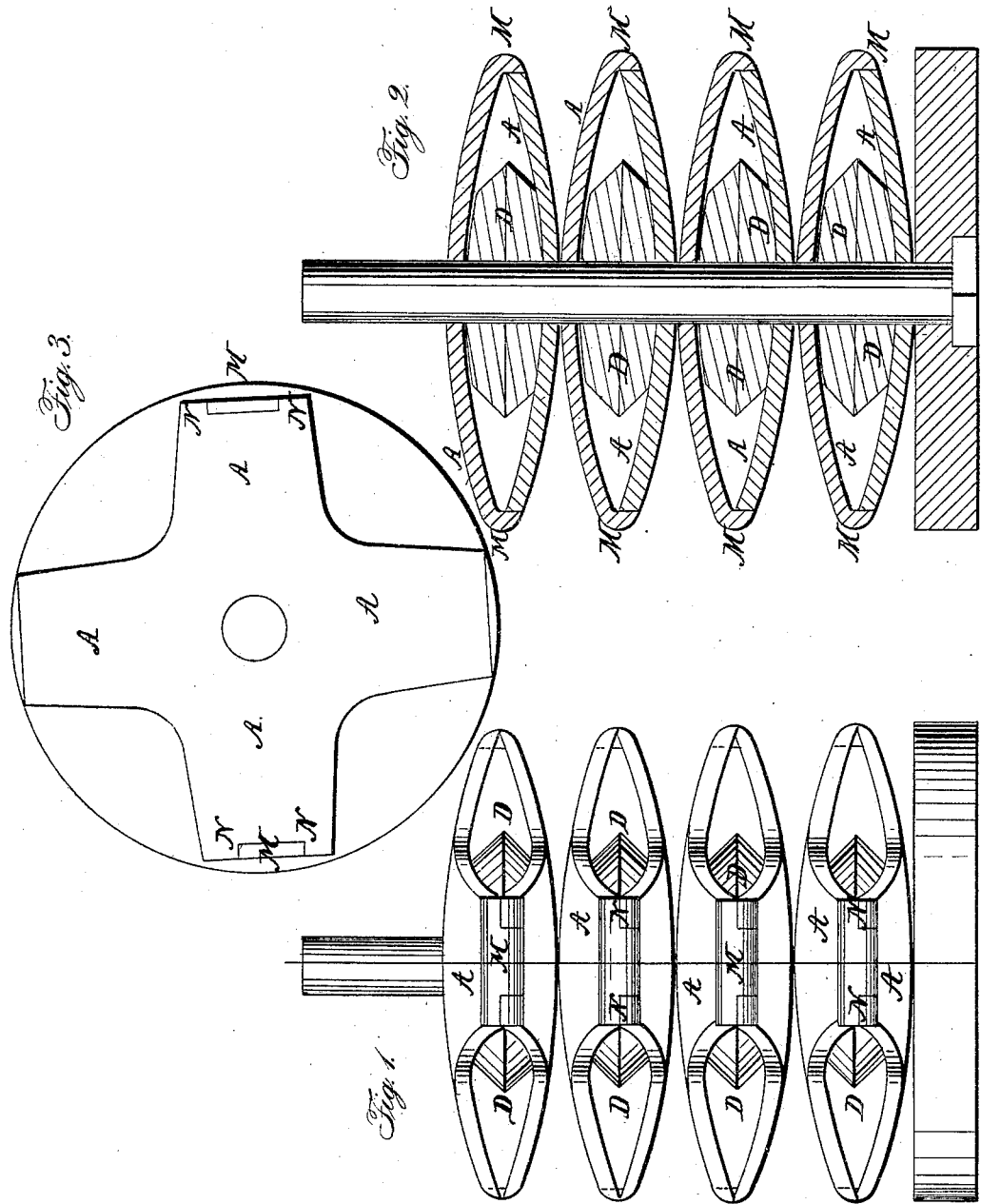
Witnesses:
Inventor:

UNITED STATES PATENT OFFICE.

HENRY A. ALDEN, OF MATTEAWAN, NEW YORK.

IMPROVEMENT IN SPRINGS.

Specification forming part of Letters Patent No. 44,925, dated November 8, 1864.

*To all whom it may concern:*

Be it known that I, HENRY A. ALDEN, of Matteawan, in the county of Dutchess and State of New York, have invented certain new and useful Improvements in Springs; and I hereby declare that the following is a full, clear, and exact description of the same, reference being had to the accompanying drawings, in which—

Figure 1 is an elevation, Fig. 2 a vertical section, and Fig. 3 a plan view, of a spring constructed in accordance with this my invention.

This invention relates to springs adapted for use for machinery, railway, and other purposes, in which it is necessary to counteract violent concussions, jars, or vibrations, and has for its object economical construction combined with efficiency, durability, and permanency of elasticity, and it consists, first, in the employment of concavo-convex plates fitted in pairs upon a spindle or axle in such manner as that the convex and concave surfaces shall be opposite in combination with perforated vulcanized india-rubber disks mounted upon said spindle when interposed between the said plates and inclosed within the concavities, substantially as hereinafter set forth; second, in combining with concavo-convex plates fitted upon a spindle as described, the indenting of the plates along their circumference in such manner as to increase their elasticity to compression from the center toward the circumference, substantially as hereinafter set forth; third, in the combination, with concavo-convex plates fitted upon a spindle and indented along their circumference, as described, of vulcanized india-rubber disks interposed between said plates, in the manner and for the purpose hereinafter set forth; fourth, in the combination, with concavo-convex plates indented along their circumferences and fitted upon a central spindle, of locking the plates constituting a pair, in the manner and for the purpose hereinafter set forth.

The spring, subject-matter of this patent, is composed of dished or concavo convex plates A, made of steel in a suitable die-and-punch apparatus to give them the requisite form preferably at one operation. The plates are of a circular form, perforated through their centers for the passage through the orifices of a spindle which maintains the plates in their proper relative positions. I prefer to indent the plates along their peripheries, so as to form them into star or cross shaped disks, the corners or ends being made to taper toward the periphery of the plates, in order to increase their flexibility and elasticity proportionately to the length of the radius or distance from the center. The plates are used in pairs, and springs may be made of one, two, three, or more pairs in superposed series, each pair consisting of two plates having their concavities opposite to each other in the manner of the shells of bivalves.

To prevent the plates from being displaced by sudden jars or concussions attendant upon their use, I form upon the circumferential edges of the plates, in alternating series, tenons and mortises M and N, so that when the plates are adjusted they will interlock, and thus prevent lateral displacement.

Other modes of permanently adjusting the plates may be used with like, and, perhaps, better, results. For instance, guide-bolts may be used in the corners of indentations, or the holes in the centers of the plates may be made square or of other angular or oblong configuration, and in connection therewith a correspondingly-shaped bolt or spindle may be used, so that when the plates are inserted upon such bolt or spindle they will not be liable of motion upon their centers of suspension.

Together with the plates hereinbefore shown and described, vulcanized india-rubber disks D may be used to partially or wholly fill the space or concavity within each pair of plates. The inherent elasticity of the rubber will thus materially aid the plates in their functions by giving them a greater resistance to compression, and by preventing the plates from coming into contact when exposed to undue pressure.

Having thus fully described my invention and the manner in which the same is or may be carried into effect, I claim—

1. The employment of concavo-convex plates fitted in pairs upon a spindle or axle in such manner as that the convex and concave surfaces shall be opposite, in combination with perforated vulcanized india rubber disks mounted upon said spindle, when interposed between the said plates and inclosed within their concavities, substantially as set forth, 2. In combination with concavo-convex plates fitted upon a spindle, as described, indenting the plates along their circumferences in such manner as to increase their elasticity to compression from the center toward the circumference, substantially as set forth.

3. In combination with concavo-convex plates fitted upon a spindle and indented along their circumferences, as described, the use of vulcanized-india-rubber disks, interposed between said plates in the manner and for the purpose set forth.

4. In combination with concavo-convex plates indented along their circumferences and fitted upon a central spindle, the mode herein described, or its substantial equivalent, of locking the plates constituting a pair in the manner and for the purpose set forth.

In testimony whereof I have signed my name to this specification before two subscribing witnesses.

H. A. ALDEN.

Witnesses:
H. H. HUSTIS,
GUERNSEY SMITH.